United States Patent Office 3,669,700
Patented June 13, 1972

3,669,700
CEMENT COMPOSITION FOR LINING PIPE
Horace J. Beach and Howard J. En Dean, Houston, Frank E. Frawley, Monahans, and Dick Yates, Midland, Tex., assignors to Gulf Research & Development Company, Pittsburgh, Pa.
No Drawing. Filed Apr. 17, 1969, Ser. No. 817,165
Int. Cl. C04b 31/02
U.S. Cl. 106—98                                 6 Claims

ABSTRACT OF THE DISCLOSURE

A cement composition for lining steel pipe by centrifugal casting of a slurry of the cement composition comprising sand particles of uniform particle size to avoid gradation of the sand during the centrifugal casting of the lining and portland cement in a concentration adequate to just fill the voids between, and wet the surface of, the sand particles. A small amount of fly ash pozzolan is included in the composition to increase the fluidity of the stiff sludge formed by mixing the cement composition with water used in the casting. After centrifugal casting of the lining in the pipe, the pipe is stored in an undisturbed condition until initial set begins after which the lining is steam cured and water flooded.

---

This invention relates to cement-lined pipe and more particularly to a composition and method for lining steel pipe with cement to produce a lined pipe resistant to corrosive waters.

Cement-lined pipe is widely used in the oil fields for transporting water used in water flooding operations in an effort to increase the life of steel pipe. Because fresh water is not available for water flooding, it is necessary to use brines or brackish water which ordinarily contains substantial quantities of dissolved salts, particularly sulfates and chlorides, and may have a low pH. Both the dissolved salts and low pH greatly increase the rate at which the water corrodes steel. To be economical the cement-lined pipe should have a life of 10 to 20 years, but most cement-lined pipe has had a much shorter life when handling brackish water.

Cement compositions comprising approximately 40 percent portland cement and approximately 60 percent pozzolans have been widely used for lining cement pipe in an attempt to provide a better lining than ordinary cement-sand compositions. The effective pozzolans are fine particles of silica and alumina which react with lime freed by hydration of the tricalcium silicate in cement to form calcium silicates and aluminates which contribute to the strength of the cement. Pozzolans have the further advantages of reducing the over-all heat of hydration and thereby reduce the tendency of the cement structure to develop thermal cracks. Pozzolans also cause some expansion during the setting of cement and thereby counteract the normal shrinkage of cement to reduce the porosity and volume changes in cement. In spite of the theoretical advantages of pozzolans, pipe lined with cement-pozzolan compositions has not withstood corrosive waters satisfactorily and lives of 10 years or more of such pipe are not usually attained.

This invention resides in a cement composition for lining steel pipe comprising a Portland ASTM Type III cement containing no tricalcium aluminate, a small amount of fly ash pozzolan, and sand. It is essential to this invention that the sand particles be within a narrow range of particle sizes whereby there is no substantial classification of the sand particles on centrifugal casting of the cement composition in the pipe. The fly ash pozzolan is present in low concentrations adequate to facilitate flow of cement during the centrifugal casting of the cement in the pipe. The concentration of portland cement in the composition is such that the volume of cement just fills the voids in the quartz framework without forming an inner layer of neat cement of appreciable thickness. This invention also contemplates a method of lining pipe with the novel cement composition in which the cement composition is placed in the pipe and the pipe is spun to cast the lining in the pipe and to remove excess water. The cement-lined pipe is stored in an undisturbed condition until initial set begins, and is then steam cured and water flooded. The novel cement composition and method of cement lining pipe for this invention results in a quartz framework with each grain of sand wet by the cement and touching its neighbors.

We have discovered that a principal cause of the failure of cement linings of steel pipe is the result of lamination or layering and nonuniformity of the cement lining. In linings of cement-sand mixture, grading of sand grains occurs with the larger grains near the pipe wall and smaller grains near the center of the pipe and a layer of excess cement at the inner surface of the lining. On setting the inner layer of cement created a stress with the adjacent sand-cement layer. Pozzolans are usually present in the pozzolan-type cements with a range of particle sizes substantially broader than the range of sizes of the cement particles. During the centrifugal casting the pozzolan particles separate because of the differences in density and size. Variations in the size of the particles have a larger effect in causing separation than the differences in density. Linings have been examined with as many as six distinct layers with the concentration of pozzolan in the lining high adjacent the wall of the pipe and at the inner surface of the lining. The difference in composition of the layers results in a laminated, easily separated lining of little strength. We have found, further, that calcium carbonate and gypsum are concentrated in voids formed between layers in the lining. Since the calcium carbonate and gypsum have substantially no cementitious properties, those deposits contribute to the ease with which the layers are separated.

The cement composition of this invention comprises ASTM Type III Portland cement containing no tricalcium aluminate, flyash pozzolan and sand. The Type III portland cement can be obtained from the Lone Star Cement Company, Maryneal, Tex. The ingredients of the composition are in proportions such that the sand during the centrifugal casting forms a framework of sand particles in which each particle touches adjacent particles. The concentration of cement in the composition is just adequate to wet the surface of the sand particles and fill the voids between the sand particles, but is not high enough to provide a sand-free layer of cement on the inner surface of the lining. The fly ash pozzolan is present in a low concentration, up to about 8 percent by weight of the solids in the mixture, adequate to increase the fluidity of the cement composition, but should not be high enough to cause the undesirable layering that occurs in the cement-pozzolan mixes heretofore used. Fly ash pozzolans consist of substantially spherical particles that serve as a lubricant aiding in distributing the cement composition uniformly over the inner surface of the pipe during casting. Other pozzolans such as volcanic ash not having the spherical-particle shape are not effective in improving the fluidity.

A preferred cement composition is 35 percent by weight ASTM Type III portland cement containing no tricalcium aluminate, 5 percent by weight fly ash pozzolan and 60 percent by weight sand. If the cement concentration is increased to 40 percent, by weight an excess of cement is present, and a layer of sand-free cement forms on the inner surface of the lining. Concentrations of cement lower than that required to fill the voids between the sand particles result in sand particles on the inner surface of the lining being incompletely cemented and easily eroded from the inner surface of the lining. Water is added to the cement composition in an amount to form a stiff sludge. In the preferred cement composition 13 to 14 pounds of water are mixed with 100 pounds of solids.

It is important to this invention that the sand particles be within a narrow range of particle sizes to avoid any substantial gradation of the sand during the spinning of the pipe during the casting of the cement. A suitable sand is one that meets ASTM specification C–33 in which approximately 90 percent of the particles pass through a 30-mesh screen and are retained on an 80-mesh screen in the U.S. Sieve Series. The sand should be at least 95 percent quartz and contain not more than 5 percent of other inert silicas, such as orthoclase feldspar, to provide a lining of the desired strength. The size of the sand particles will depend in part on the thickness of the lining. If larger sand particles are desired, for example in lining large pipe, sand passing through 10-mesh and retained on 50-mesh screens in U.S. Sieve Series can be used. It is desirable that there be at least 8 particles of sand across the thickness of the lining.

Steel pipe is lined by casting the cement mixture described above in the pipe in a single operation to avoid layering in the cement lining. A preferred method of casting the cement is to pump the cement mixture through a lance extending through the pipe to the far end of the pipe and withdrawing the lance at a rate that will discharge cement in an amount slightly in excess of that required to form a lining of the desired thickness. Annular ring caps are fastened to the pipe ends to control the lining thickness and allow discharge of excess mortar during spinning of the pipe. The thickness of cement lining will depend on the size of the pipe. Table I lists desired lining thickness for different sizes of pipe.

TABLE I.—LINING THICKNESS SPECIFICATION

| Nom. pipe size (in.) | Minimum any point (in.) | Optimum (in.) |
| --- | --- | --- |
| 2 through 3 | 3/16 | 1/4 |
| 4 through 7 | 1/4 | 3/8 |
| 8 through 10 | 3/8 | 5/8 |
| 12 through 14 | 5/8 | 7/8 |
| 16 through 20 | 3/4 | 1 |
| 20+ | 7/8 | 1 1/3 |

The pipe is supported on rollers and spun just fast enough and long enough to place the cement compositions and remove excess water. Rotation of the pipe is begun slowly to aid in spreading the cement over the inner surface of the pipe. An acceleration period of about 15 seconds is used to increase the speed of rotation to a preliminary spin during which a sizing tool is run through the pipe to adjust the thickness of the lining. After the preliminary spin, the rate of rotation is increased to give a peripheral speed of 1000 to 1100 feet per minute which is maintained for up to two minutes, depending on the size of the pipe. Excessive speeds and times of spinning are detrimental. Times of spinning for different pipe sizes are set forth in Table II.

TABLE II.—PIPE SPIN SCHEDULE

| Pipe size (in.) | Initial spin (sec.) | Main spin (sec.) |
| --- | --- | --- |
| 2 3/8 | 15 | 30 |
| 2 7/8 | 15 | 45 |
| 3 1/2 | 15 | 45 |
| 4 1/2 | 15 | 60 |
| 6 5/8 | 15 | 90 |
| 8 5/8 | 15 | 90 |
| 10 3/4 | | 105 |
| 12 3/4 | | 120 |
| 14 | | 120 |
| 16 | | 120 |

After the main spin, the pipe is slowed over a deceleration period of approximately 15 seconds until the pipe is just barely rotating. Very slow rotation is continued for approximately 30 seconds while the ends of the cement lining are finished. Rotation is stopped and one end of the pipe is raised to allow excess water to drain from the pipe. Raising one end of a 40 foot section of pipe two feet will allow drainage of excess water from the pipe at an acceptable rate.

The lined pipe is then rolled carefully and slowly to avoid jarring to a holding rack where the pipe is held for a period of two to four hours. While on the holding rack the pipe is given a half turn every 15 to 30 minutes to spread any thin layer of water that may bleed from the lining. After about one hour on the holding rack, the annular end caps are removed from the pipe with a rotating motion to prevent sticking of the cement to the caps.

At the beginning of initial set of the cement, as shown by the evolution of heat, and in any event within four hours of the end of the spinning, lined joints of pipe are transferred to a steam chamber in which they are steam cured. The length of steam curing will depend on the temperature maintained during the curing. For example, a curing period of 18 hours at a minimum temperature of 140° F. is suitable. If the curing temperature is dropped to 120° F., the curing period should be increased to 24 hours. The temperature of the lined joints is raised to the curing temperature at a rate of approximately 1° F. per minute and lowered at the same rate after the steam curing is completed.

After the steam curing has been completed, the pipe is flooded with water and end caps installed to retain the water. The water flooding is continued for 30 days with periodic inspections to make sure that water is present in the pipe and that the linings do not have an opportunity to dry.

The cement composition and pipe lining method of this invention results in a lining that is uniform from the pipe wall to the inner surface of the lining. The quartz framework extending through the lining in which each sand grain contacts its neighbor forms a lining having a high compressive strength. The average 28-day strength of lining prepared according to this invention is approximately 20,000 p.s.i.

We claim:

1. A cement composition for lining steel pipe by centrifugal casting consisting essentially of ASTM Type III portland cement containing no tricalcium aluminate, sand, and flyash pozzolan, the particles of sand being of substantially uniform size whereby there is substantially no gradation of the sand particles in the cement upon centrifugal casting, the concentration of pozzolan being effective to improve the fluidity of the cement composition but less than 8 percent by weight of the total solids in the cement composition, and the concentration of the cement being adapted to just fill the voids between and wet the surface of the sand particles.

2. A cement slurry for lining pipe comprising the cement composition of claim 1 and water in an amount effective to form a stiff sludge.

3. A cement composition as set forth in claim 1 in which the concentration of the ASTM Type III portland cement ranges from a concentration just adequate to fill voids between the sand particles up to 40 percent by weight of the total solids.

4. A cement composition as set forth in claim 1 in which 90 percent of the sand particles pass through a 30-mesh and are retained on an 80-mesh screen in the U.S. Sieve Series.

5. A cement composition as set forth in claim 1 in which the sand particles pass through a 10-mesh screen and are retained on a 50-mesh screen in the U.S. Sieve Series.

6. A cement slurry composition for lining steel pipe by centrifugal casting comprising solids consisting essentially of approximately 35 percent by weight ASTM Type III portland cement containing no tricalcium aluminate, approximately 5 percent by weight flyash pozzolan, and approximately 60 percent by weight sand in which 90 percent of the particles of sand pass through a 30-mesh screen and are retained on an 80-mesh screen, and water in an amount in the range of 12 to 14 percent by weight of the solids.

References Cited

UNITED STATES PATENTS

| | | | |
|---|---|---|---|
| 3,519,449 | 7/1970 | Babcock | 106—89 |
| 3,503,767 | 3/1970 | Gaines et al. | 106—89 |
| 3,341,341 | 9/1967 | Corson et al. | 106—98 |
| 3,287,801 | 11/1966 | Blenkarn | 264—270 |
| 3,118,779 | 1/1964 | Leonard | 106—89 |

FOREIGN PATENTS

| | | |
|---|---|---|
| 6,279 | 5/1963 | Japan. |
| 6,280 | 5/1963 | Japan. |

OTHER REFERENCES

Lea and Desch, "The Chemistry of Cement and Concrete," Edw. Arnold & Sons, pp. 153, 366, 563–564 (1956).

Taylor, W. H., "Concrete Technology and Practice," American Elsevier, pp. 249, 339–340, 467 (1965).

JAMES E. POER, Primary Examiner

W. T. SCOTT, Assistant Examiner

U.S. Cl. X.R.

106—89, 97, Digest 1; 264—270